W. O. CROCKER.
Improvement in Egg-Beaters.

No. 131,600.          Patented Sep. 24, 1872.

Witnesses:
E. Wolff
C. Sedgwick

Inventor:
W. O. Crocker
PER Munn & Co.
Attorneys.

UNITED STATES PATENT OFFICE.

WILLIAM O. CROCKER, OF LACONIA, NEW HAMPSHIRE.

IMPROVEMENT IN EGG-BEATERS.

Specification forming part of Letters Patent No. 131,600, dated September 24, 1872.

*To all whom it may concern:*

Figure 1:
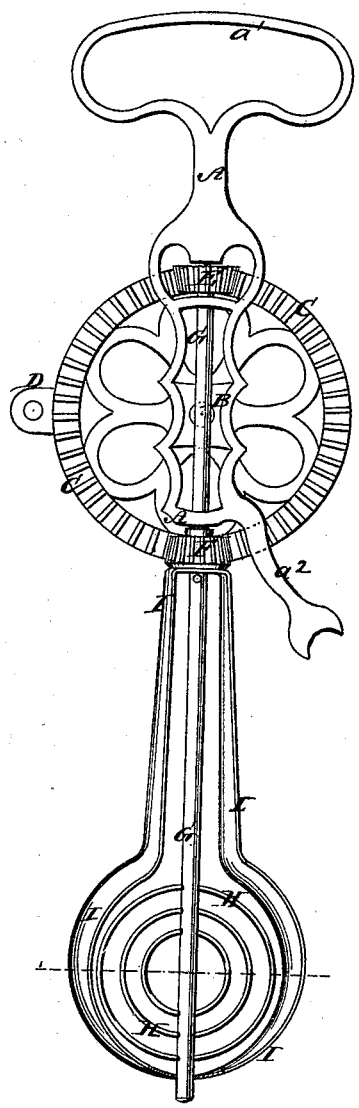
Figure 2:
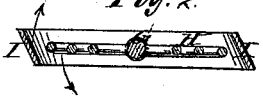

Be it known that I, WILLIAM O. CROCKER, of Laconia, in the county of Belknap and State of New Hampshire, have invented a new and useful Improvement in Egg-Beater, of which the following is a specification:

Figure 1 is a detail side view of my improved device. Fig. 2 is a detail cross-section of the same taken through the line $x\,x$, Fig. 1.

Similar letters of reference indicate corresponding parts.

My invention has for its object to furnish an improved device for beating eggs, butter, &c., churning small quantities of cream, and for other similar purposes, and which shall be simple in construction, convenient in use, and effective in operation, doing its work quickly and well; and it consists in the construction and combination of various parts of the device, as hereinafter more fully described.

A is a small frame, upon the upper end of which is formed a handle, $a^1$, for convenience in holding it while being used. Upon the lower end of the frame A is formed an outwardly inclined arm, $a^2$, having a notch formed in its lower end to adapt it to rest upon the edge of the dish containing the substance to be operated upon. If desired, several notches may be formed in the lower part of the arm $a^2$ to adapt it to be used with different-sized dishes. Upon the middle part of the frame A is formed, or to it is attached, a gudgeon, B, upon which is placed a wheel, C, to which is attached, or upon which is formed, a crank-pin or handle, D, by which the machine is operated. Upon the inner side of the rim of the wheel C are formed gear-teeth, into which mesh the teeth of the small gear-wheels E F. The gear-wheel E is placed at the upper part of the wheel C, and is attached to the upper end of the rod or wire G, which revolves in bearings formed to receive it in the frame A. To the lower end of the rod G are attached wires H, so arranged as to form a beater. Upon the rod G is placed the gear-wheel F, in such a way that its teeth may mesh into the teeth of the wheel C at its lower part. The wheel F revolves loosely upon the rod G, and is kept from slipping down upon the said rod by a pin, collar, or other convenient means. I is a narrow strip of thin sheet metal, in the middle part of which is formed a hole to receive the lower end of the rod G. The lower part of the strip I is bent into a loop, and its sides are bent or made flaring in opposite directions, as shown in Figs. 1 and 2. The arms or end parts of the strip I pass up upon the opposite sides of the rod G, and their ends are attached to the lower side of the wheel F. The strip I may be of uniform width, or some parts of it may be wider than others.

By this construction, when the wheel C is revolved the wheels E F and their respective beaters G, H, and I will be revolved in opposite directions. The tendency of the revolving interior beater G H is to throw the substance being operated upon outward, and the tendency of the outer beater I, from its peculiar form, is to throw it inward, so that the inner beater may operate more effectively upon it.

Having thus described my invention, I claim as new, and desire to secure by Letters Patent—

1. The outer beater I, formed of sheet metal, and having its sides flared in opposite directions, in combination with the inner beater H, the same being connected with the mechanism, as specified, so as to be driven in reverse directions, as set forth.

2. The combination, with the beater, of the downwardly-extended arm $a^2$, provided with a notch, as specified, whereby said beater may be supported on the edge of the dish containing the material to be operated on, as set forth.

WILLIAM O. CROCKER.

Witnesses:
JOHN H. TILTON,
CYRUS GILMAN.